May 3, 1955   W. VAN LOON   2,707,444
CYCLONE FURNACE
Filed Sept. 11, 1950

INVENTOR
Willem van Loon
Cushman, Darby & Cushman
ATTORNEYS

United States Patent Office 2,707,444
Patented May 3, 1955

2,707,444

CYCLONE FURNACE

Willem van Loon, Geleen, Netherlands, assignor to De Directie van de Staatsmijnen in Limburg, handelend voor en namens de Staat der Nederlanden, Heerlen, Netherlands Application September 11, 1950, Serial No. 184,257

Claims priority, application Netherlands September 15, 1949

3 Claims. (Cl. 110—28)

The present invention relates to cyclone furnaces for burning fine grained fuels such as coal fines, fine peat, cokebreeze, saw dust, scale, chaff and the like.

It is well known that the combustion of fine fuels may be effected in vortex chambers, i. e., radially symmetrical reaction chambers into which the fuel and the combustion air are introduced tangentially. Under the name of cyclone furnaces, vortex chambers of this kind are described in Babcock and Wilcox British Patent No. 552,747, accepted April 22, 1943. However, the apparatus proposed therein is not constructed to allow the production of a true cyclonic action characterized by two helical movements proceeding axially towards opposite ends of the chamber. Furthermore, such a so-called cyclone furnace, if arranged with its axis vertical, involves the disadvantage that the liquid slag cannot be discharged at the point of highest temperature. As a result, difficulties due to clogging are encountered.

I have discovered that by improving the construction of the vortex chamber so that a true cyclonic action is realized, a better contact between the fuel and the combustion medium is obtained and the liquid slag can be discharged at the point where the temperature is the highest.

According to the present invention, a cyclone furnace for burning fine grained fuels is provided and which comprises a radially symmetrical combustion casing having one or more tangential inlets for combustion medium and entrained fuel, and an axial outlet for the gases of combustion. The casing has internally thereof, preferably at both of its end portions, a radially symmetrical annular chamber adjoining the corresponding end wall of the casing and in communication with the remainder of the casing, the said tangential inlet or inlets for combustion medium and entrained fuel leading into the annular chamber at the combustion gas outlet end of the casing and an outlet for liquid slag being provided at the opposite end of the casing. If, as preferred, annular chambers are provided at each end of the casing, the slag outlet will extend from the chamber which is at the end opposite the gas outlet end.

Figure 1:
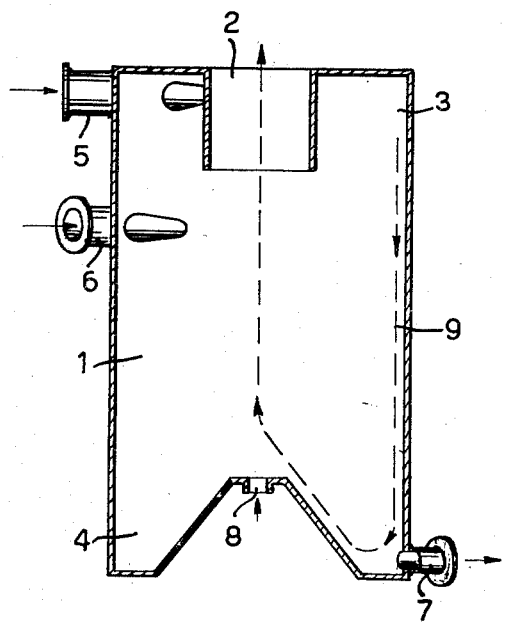
Figure 2:
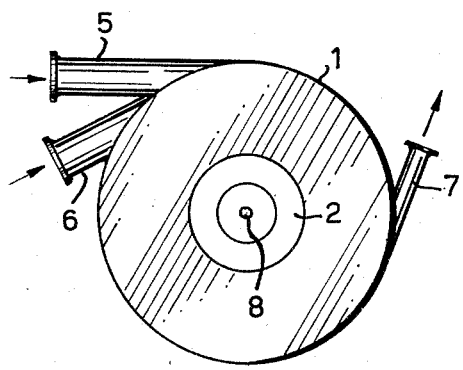

In order that the invention can be more readily understood, reference will now be made to the accompanying drawings which illustrates a cyclone furnace constructed in accordance with the invention. In Figure 1 an axial section and in Figure 2 a plan of the furnace is shown.

The cyclone furnace of the present invention preferably is constructed of refractory material including chromium oxide or aluminum oxide, the material being protected by the provision of a cooling system in the furnace wall, for example, cooling coils or cooling compartments fitted with baffle plates. In order to reduce the risk of the wall burning through, dead corners in the cooling systems must be avoided. The cooling system preferably is constructed to operate with water as cooling medium.

The furnace comprises a combustion chamber or casing 1 provided with an axial outlet 2 for the gases of combustion, the wall or flange defining the said outlet cooperating with the adjacent part of the outer casing wall to define a radially symmetrical annular space 3 at one end of the casing. The opposite end of casing 1 is provided with a radially symmetrical annular space or chamber 4. The inlet opening 5 for part of the combustion medium, e. g., "primary air," and in which the fuel is entrained, leads tangentially into the annular space 3, and the remaining part of the combustion medium, e. g., "secondary air," is introduced into the casing through an inlet 6. An aperture 7 forms the discharge outlet for the liquid slag. In the illustrated example, an axial inlet 8 has been provided for the introduction of additional amounts of the air or other combustion medium. The dotted line 9 in the figure indicates the direction in which the helical movements propagate through the furnace.

Instead of a cylindrical combustion casing as shown in the figure, other radially symmetrical shapes may be employed, such as a conical or otherwise tapered casing. Furthermore, the inner walls of the radially symmetrical annular spaces may be curved in the axial direction instead of conforming to the wall of a cylinder or cone.

In practice, the cyclone furnace casing is usually positioned with its longitudinal axis vertical, the outlet 2 for the gases of combustion being located at the top. Alternatively, the cyclone furnace casing may be positioned with its longitudinal axis inclined. However, if the axis is tilted, the liquid slag discharge aperture will be located at the lowest point of the furnace in order to insure an unimpeded discharge of the slag.

The cyclone furnace of the invention retains the fine material better than apparatus heretofore proposed. Moreover, an intimate contact between the fuel and the combustion medium is insured so that combustion is promoted. Furthermore, the gases of combustion contain very little fly ash because the ash constituents melt under the high temperatures prevailing in the furnace and can be discharged either continuously or discontinuously as liquid slag from the annular space 4 remote from the gas outlet 2, and in which annular space the furnace temperature is the highest. Advantageously the fuel particles are prevented from being entrained by the outgoing slag by disposing the outlet 7 for the slag, the so-called slag hole, tangentially to the interior wall of the casing in the direction opposite to the direction of the helical movement of the fuel particles. If desired, the composition and the fusion point of the slag may be modified by adding lime, silicon, martin slag, fluorspar, etc., to the fuel.

The efficiency of the cyclone furnace may be promoted by providing more than one inlet for the combustion medium and entrained fuel leading into the annular space at the gas outlet end of the chamber and/or more than one inlet into the medial portion of the chamber for additional supply of combustion medium. The sizes of the inlets to the combustion chamber are preferably so chosen that the cross-sectional area of the outlet 2 for the gases of combustion is from approximately one to three times that of the total cross-sectional area of all the inlets 5, 6 and 8 to the casing. The cyclonic action is in general promoted if the dimensions of the furnace are chosen so that the length of the combustion chamber defined by the casing approximates from one to two times its average diameter.

Dimensional relations other than those mentioned may be chosen for certain special purposes, e. g., the resistance in the cyclone may be reduced by providing a larger gas outlet 2, with the attendant result that solid particles are more easily entrained from the cyclone by the outgoing gases of combustion.

Combustion in the furnace and the composition of the gases of combustion may be regulated by providing the second axial opening 8 for the supply of additional combustion medium at the end of the chamber remote from the axial outlet 2 for the gases of combustion. The realization of a true cyclonic flow is also promoted by the provision of the second axial opening 8 in the chamber.

When operating the furnace the ignition can be started in an easy way by means of a small amount of a burning liquid or gaseous fuel, which is introduced together with the combustion medium. When the combustion has started the feed of the combustion medium entraining the solid material to be gasified is adjusted preferably at such a rate that substantially no solid particles are entrained from the furnace by the outgoing gases of combustion.

The cyclone furnace according to the invention may be adapted to various purposes. In the event that the furnace is employed as a combustion apparatus for fines in a boiler plant, the cooling system of the furnace may be connected into the water circulation system of the boiler.

The apparatus also may be employed as a heat reaction chamber; for example, in the gasification of fine grained coal, carbonaceous and/or carbonizable substances. Successive heat reaction chambers of the type described may be employed in series, or with other types of reactors.

As a further example, the cyclone furnace may be used to supply the energy for driving a gas turbine. To this end the cyclone furnace may be constructed to withstand high pressures, enabling the combustion to be effected therein under pressure. After being mixed with cold gas, the resulting fly-ash free gases of combustion are suitable for driving a gas turbine.

The terminology used in the specification is for the purpose of description and not of limitation, the scope of the invention being indicated in the claims.

I claim:

1. A cyclone furnace for burning fine grained fuels, comprising a radially symmetrical combustion casing including end closing portions, at least one end portion comprising a substantially radial end wall provided with a central gas outlet, a circular projection concentric with the gas outlet extending into the casing interior and defining said outlet and an annular space radially outwardly of said projection, said annular space being open to the remainder of the casing, the peripheral wall of the casing within the length of said projection being provided with a tangentially disposed inlet for combustion medium and entrained granular fuel particles, said casing being provided at the end thereof remote from said gas outlet with a slag outlet, the casing being of sufficiently larger diameter than the projection to afford a space radially larger than said projection and axially disposed from said annular space to provide for movement of infed combustion medium and entrained granular fuel particles in an outer vortex moving axially toward said other end portion of the casing and an inner vortex moving axially toward said projection, the inner end of said circular projection being spaced from the other end portion of the casing by a distance substantially greater than the axial length of the projection to cause the inner and outer vortices to be mutually accessible throughout a substantial portion of their lengths, said slag outlet extending tangentially from said casing in the direction opposite to the direction of rotation of the outer vortex.

2. A cyclone furnace for burning fine grained fuels, comprising a radially symmetrical combustion casing including end closing portions, each of said end portions including a circular projection concentric with the casing, one of said projections being provided with a central gas outlet, each of said projections respectively defining an annular space radially outwardly of said projection, each annular space being open to the remainder of the casing, the peripheral wall of the casing being provided with a tangentially disposed inlet adjacent the end portion provided with the gas outlet lying within the length of the central projection of that end portion, the peripheral wall of the casing being also provided at the end opposite said projection with a slag outlet, the casing being of sufficiently larger diameter than the projections to afford a space radially larger than said projections and axially disposed from said annular spaces to provide for movement of infed combustion medium and entrained granular particles in an outer vortex moving axially from the combustion medium inlet and an inner vortex moving axially toward the gas outlet, the inner ends of the projections being spaced apart axially a sufficient distance to cause the inner and outer vortices to be mutually accessible throughout a substantial portion of their lengths, said slag outlet extending tangentially from said casing in the direction opposite to the direction of rotation of the outer vortex.

3. The method of burning fine grained fuel comprising entraining the fuel in a combustion medium tangentially into one end of a radially symmetrical chamber under such pressure that the fuel and medium will move in a helical path toward the opposite end along the outer portion of the chamber and will then move in a helical path centrally of the chamber to return to the first-mentioned end, admitting secondary air to said chamber axially through the opposite end thereof, and discharging slag tangentially of the chamber at the end remote from the gas outlet, in the direction opposite to the direction of rotation of the outer vortex.

References Cited in the file of this patent

UNITED STATES PATENTS

| | | |
|---|---|---|
| 1,180,792 | Norrman | Apr. 25, 1916 |
| 1,657,725 | Schutz | Jan. 31, 1928 |
| 1,946,011 | Burg | Feb. 6, 1934 |
| 2,357,303 | Kerr et al. | Sept. 5, 1944 |
| 2,395,103 | Clausen et al. | Feb. 19, 1946 |
| 2,527,934 | Jefferies | Oct. 31, 1950 |

FOREIGN PATENTS

| | | |
|---|---|---|
| 305,270 | Great Britain | Feb. 1, 1929 |
| 16,270 | Australia | June 25, 1929 |